United States Patent
Scheidmantal et al.

(10) Patent No.: US 6,983,967 B2
(45) Date of Patent: Jan. 10, 2006

(54) ARMREST WITH SIDE IMPACT RESISTANCE FEATURE

(75) Inventors: David A. Scheidmantal, Rockford, MI (US); Roger A. Nelson, Wixom, MI (US); Luke J. LaPanne, Hopkins, MI (US); Christopher D. Sorenson, Byron Center, MI (US); Chris T. Woodthorp, Blanchard, MI (US); Lee A. Ash, Cedar Springs, MI (US); Robert V. Sullivan, Jenison, MI (US); William S. Longcore, Belmont, MI (US)

(73) Assignee: Leon Plastics, Inc., Grand Rapids, MI (US)

( * ) Notice: Subject to any disclaimer, the term of this patent is extended or adjusted under 35 U.S.C. 154(b) by 0 days.

(21) Appl. No.: 10/604,697

(22) Filed: Aug. 11, 2003

(65) Prior Publication Data

US 2004/0108751 A1    Jun. 10, 2004

Related U.S. Application Data

(60) Provisional application No. 60/319,464, filed on Aug. 12, 2002.

(51) Int. Cl.
    *B60N 2/46*    (2006.01)
(52) U.S. Cl. ............................... 296/1.09; 296/187.05; 296/187.12; 296/153
(58) Field of Classification Search ............. 296/1.09, 296/153, 187.03, 187.05, 187.12, 146.7, 296/39.1, 35.1, 35.2; 297/227, 411.21, 411.22, 297/411.37, 411.45, 751, 224
See application file for complete search history.

(56) References Cited

U.S. PATENT DOCUMENTS

| 4,783,114 A | * | 11/1988 | Welch .......................... 296/153 |
| 4,786,100 A | * | 11/1988 | Kleemann et al. ........ 296/146.6 |
| 5,181,759 A | * | 1/1993 | Doolittle ...................... 296/153 |
| 5,445,430 A | * | 8/1995 | Nichols ........................ 296/153 |
| 5,527,084 A | * | 6/1996 | Scherf .......................... 296/153 |
| 5,573,272 A | * | 11/1996 | Teshima ...................... 280/751 |
| 5,857,702 A | * | 1/1999 | Suga et al. ................. 280/751 |
| 5,967,594 A | * | 10/1999 | Ramanujam ................. 296/153 |
| 6,183,038 B1 | * | 2/2001 | Hansen et al. ........... 296/146.7 |
| 6,213,538 B1 | * | 4/2001 | Scheidmantel et al. ..... 296/153 |
| 6,409,249 B1 | * | 6/2002 | Han ........................ 296/146.7 |
| 6,568,743 B1 | * | 5/2003 | Jayasuriya et al. ......... 296/153 |

* cited by examiner

*Primary Examiner*—D. Glenn Dayoan
*Assistant Examiner*—Greg Blankenship
(74) *Attorney, Agent, or Firm*—McGarry Bair PC

(57) ABSTRACT

A component of a motor vehicle passenger compartment comprises an internal frame in which is mounted collapsible frame that is displaced in response to the application of an abrupt force. The collapsible frame can be attached to the internal frame by shear pins that are sheared off during relative movement of the collapsible frame and the internal frame under a force of a predetermined magnitude, preferably less than the force causing injury to an occupant. Alternatively, the collapsible frame can be coupled with the inner frame by means of one or more retaining ridges. The collapsible frame can slide over the ridges when under a force of a predetermined magnitude, also preferably less than the force causing injury to an occupant.

56 Claims, 11 Drawing Sheets

ARMREST WITH SIDE IMPACT RESISTANCE FEATURE

CROSS REFERENCE TO RELATED APPLICATIONS

This application claims the benefit of U.S. Provisional Patent Application Ser. No. 60/319,464, filed Aug. 12, 2002.

BACKGROUND OF INVENTION

1. Field of the Invention

The invention relates to energy-absorbing components for passenger compartments in motor vehicles. In one aspect, the invention relates to an armrest with an internal frame that collapses when the armrest and an occupant are driven into contact. In another aspect, the invention relates to a vehicle instrument panel with an internal frame that will collapse when the instrument panel and an occupant are abruptly driven into contact.

2. Description of the Related Art

Forcible contact with various internal components of the passenger compartment during side- and rear-impact and head-on collisions frequently injures occupants of motor vehicles. For example, the armrest is usually positioned adjacent to the abdominal region that extends from the lower part of the chest to the hips. This region contains several unprotected organs and relatively fragile bones, such as ribs, which are easily injured during abdominal deflection that can occur even in minor collisions.

Automobile manufacturers have sought to mitigate the potential for such injuries by various means such as the elimination of projections and addition of cushioning. Cushioning can be disposed inside the components themselves or be external from the components by means of airbags. However, it is not feasible for the interior of the motor vehicle to be cleared of all projections, nor can the interior be made completely non-rigid. Additionally, airbags are designed to deploy during severe collisions and, therefore, might not activate during minor accidents. An occupant making forcible contact with certain components of the interior of the passenger compartment, such as an armrest or the instrument panel can still sustain severe injury in the event of an accident.

SUMMARY OF INVENTION

In one aspect, the invention relates to an armrest for a vehicle passenger compartment comprising: a collapsible frame, wherein the collapsible frame is deflectable in at least one direction upon a forcible impact received by the armrest; and a cover positioned over the collapsible frame.

In another aspect, the invention relates to an armrest for a vehicle passenger compartment comprising: a substrate adapted to be fixedly mounting to a support panel in the vehicle passenger compartment; a cover mounted over the substrate; a core disposed between at least a portion of the substrate and the cover to provide a tactile feel to the armrest; and a deflectable member retained against the substrate, wherein the deflectable member can overcome its retention against the substrate upon receipt of a suitably large impact force and move with respect to the substrate.

In an additional aspect, the invention relates to a collapsible vehicular trim component for a passenger compartment of a vehicle comprising: a substrate adapted to be fixedly mounted to a support panel on the vehicle; a cover mounted over the substrate; a core disposed between at least a portion of the substrate and the cover to provide cushioning to the component; and a deflectable member retained against the substrate, wherein the deflectable member can overcome its retention against the substrate upon receipt of a suitably large impact force and move with respect to the substrate.

In a further aspect, the invention relates to a collapsible vehicular trim component for a vehicle passenger compartment comprising: a collapsible frame, wherein the collapsible frame is deflectable in at least one direction upon a forcible impact received by the component; and a cover positioned over the collapsible frame.

Various embodiments of the invention are also contemplated. For example, a recess can be located therewithin adjacent to the collapsible frame, wherein the recess provides an area for deflection of the collapsible frame upon receipt of an impact force. The collapsible frame can comprise: a first frame member adapted to be mounted to a support member in the vehicle passenger compartment to mount to the support member; and a second frame member mounted to the first frame member by a moveable mounting. The impact force required to move the second frame can be less than that required if the second frame were permanently mounted to the first frame. The impact force required to move the second frame can be less than that able to cause injury to a bodily region of an occupant that collides with the armrest.

The moveable mounting can comprise a mounting adapted to permit movement of the second frame relative to the first frame upon receipt of the impact force. The moveable mounting can comprise at least one pin on one of the first frame and the second frame received by at least one aperture on the other of the first frame and the second frame corresponding to each of the at least one pin on the one of the first frame and the second frame.

The at least one pin can be sheared off by the at least one corresponding aperture during relative movement of the second frame with respect to the first frame. The at least one aperture can have a frustoconical shape to assist in shearing off the at least one pin. The movable mounting can comprise at least one edge on one of the first frame and the second frame received behind at least one ridge on the other of the first frame and the second frame corresponding to each of the at least one edge on the one of the first frame and the second frame. The at least one edge can cam over the at least one ridge during relative movement of the second frame with respect to the first frame. The at least one edge can have one of a semi-circular and triangular profile.

A core material can be located between the cover and the collapsible frame to provide a tactile feel therefor. The core can be composed of a foam material. The foam material can be semi-rigid. The cover can be composed of a flexible material. The cover can be composed of one of a leather, a fabric, and a polymeric material. The cover can provide an architectural finish and is composed of a material that matches the vehicle passenger compartment.

An impact force received against the cover can deflect at least a portion of the core against the collapsible frame to cause deflection of the collapsible frame. The impact force required to move the second frame can be less than that required if the second frame were permanently mounted to the first frame. The impact force required to move the second frame can be less than that able to cause injury to a bodily region of an occupant that collides therewith. A recess can be provided adjacent to the substrate, wherein the deflectable member can move into an area of the recess upon receipt of the impact force.

DETAILED DESCRIPTION

The inventive concept described herein is a collapsible vehicle passenger compartment component that is laterally displaced upon application of a predetermined force. Preferably, the predetermined force is less than or comparable to the abrupt force exerted by an occupant during a collision and also less than that required to cause injury to a bodily region of an occupant that collides with the component. The embodiments described herein are door-mounted armrests. However, the inventive concept is equally applicable to a center armrest, an instrument panel, a center console, or other component of the passenger compartment or interior of a vehicle. As well, the inventive concept is equally applicable to wheeled and non-wheeled vehicles such as automobiles, watercraft, aircraft, or any other occupied moving vehicle.

Figure 1:
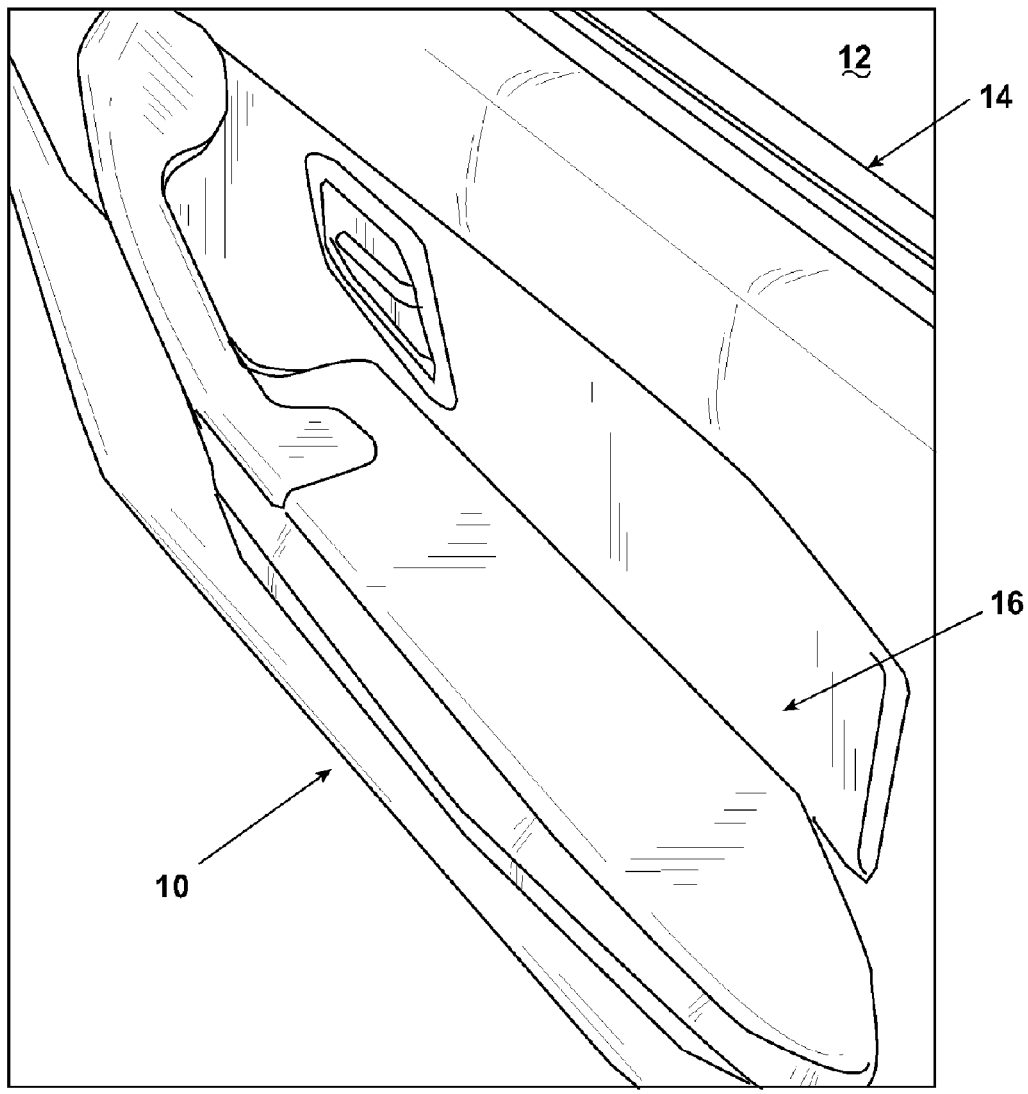
FIG. 1 is a perspective view of a portion of an interior of a motor vehicle showing a passenger door with an armrest according to the invention.
Figure 2:
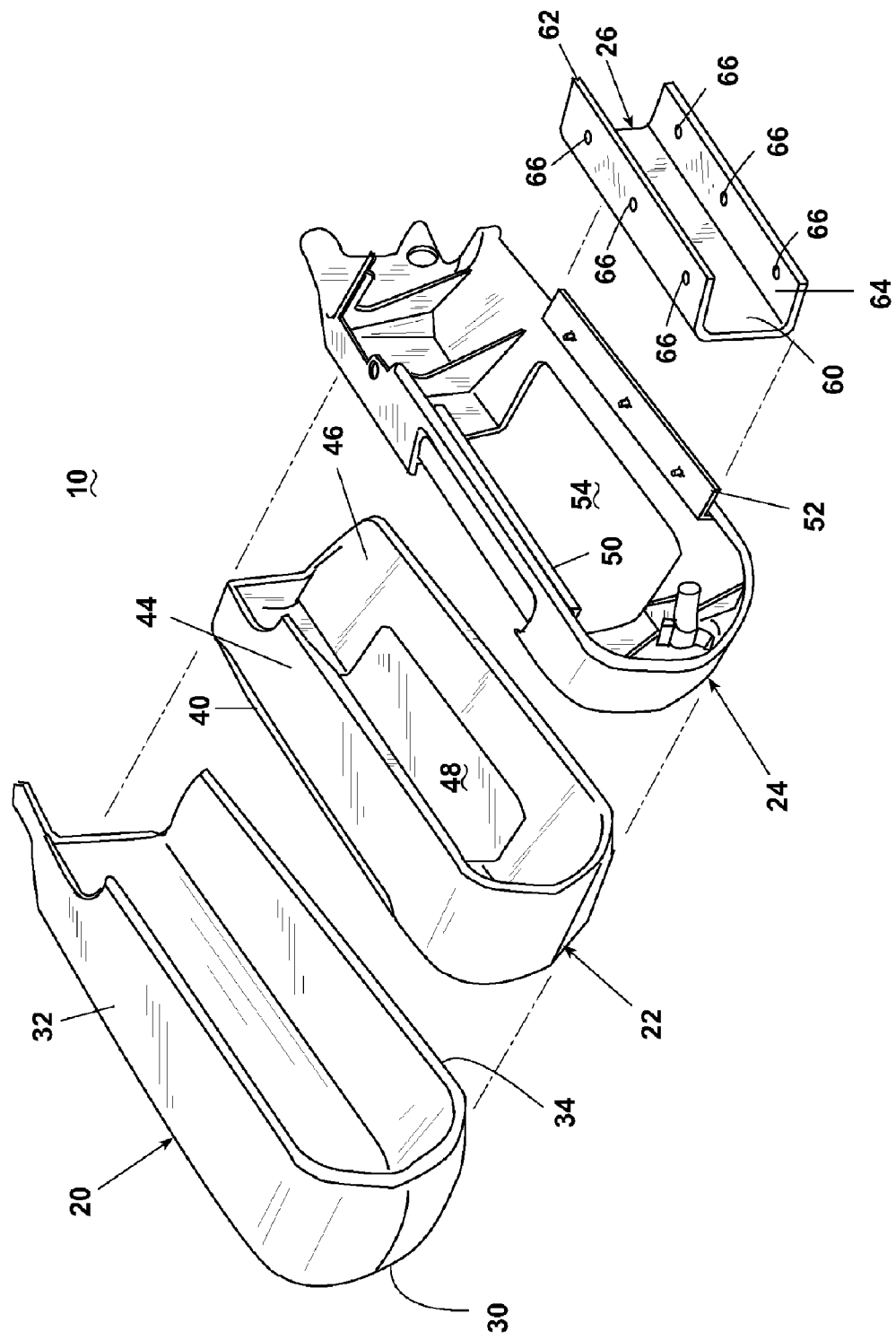
FIG. 2 is an exploded view of the armrest of FIG. 1 showing an outer shell, a foam core, an inner shell, and a collapsible frame comprising the armrest.

FIG. 1 shows a portion of the interior of motor vehicle 12, such as an automobile, having a door 14. The door 14 has an inner panel 16 to which is attached an armrest 10 in a conventional manner using conventional fastening techniques. As shown in FIG. 2, the armrest 10 comprises an outer shell 20, a foam core 22, an inner shell 24, and a collapsible frame 26. It will be recognized by one of ordinary skill in the art that a conventional armrest typically comprises an inner frame that provides structural rigidity, enables the armrest to be mounted to the door 14, and provides structural support to the foam core, which encases the inner shell and provides cushioning and a finished form to the armrest. The conventional armrest further comprises a flexible outer shell that typically comprises a fabric, leather, or vinyl, and that encases the foam core to provide an architectural finish to the armrest consistent with the styling of the vehicle. The armrest 10 described herein comprises each of these components in a manner identical to a conventional armrest. However, as described hereinafter, the armrest 10 additionally comprises the collapsible frame 26.

Figure 3:
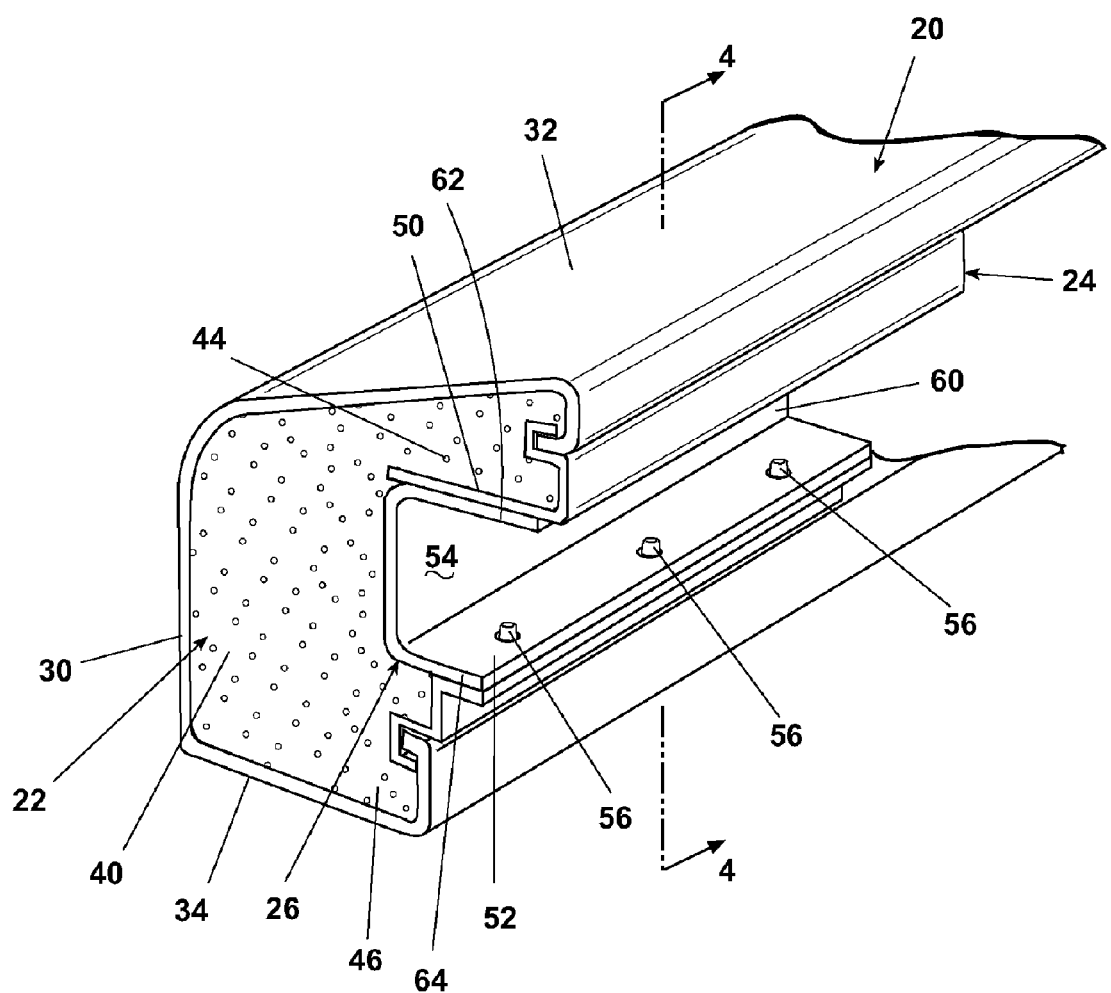
FIG. 3 is a partial perspective view of the interior of the armrest of FIG. 2.
Figure 4:
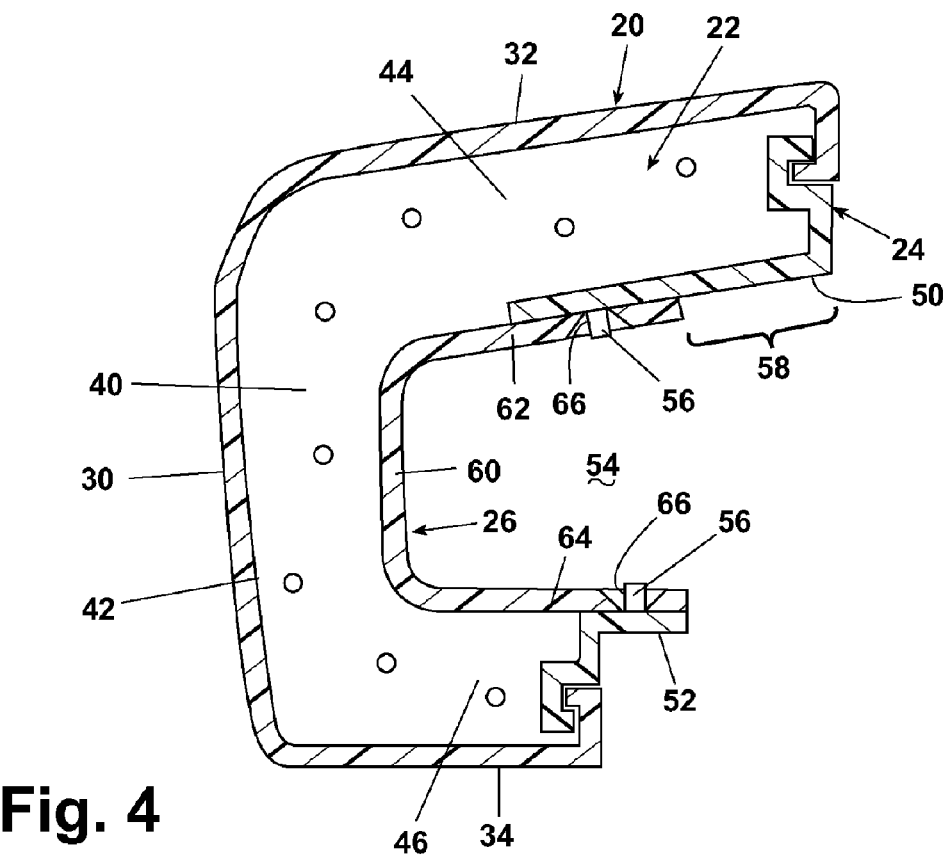
FIG. 4 is a sectional view of the armrest of FIG. 3 taken along line 4—4.

Referring also to FIGS. 3 and 4, the outer shell 20 comprises a thin, membrane-like veneer covering the foam core 22 and having a vertical face 30, an upper face 32, and a lower face 34. In the preferred embodiment, the outer shell 20 comprises a material which can readily conform to the shape of the underlying foam core 22, such as fabric, leather, vinyl, or another suitable polymeric material.

The foam core 22 comprises a conventional semi-rigid foam that is well-known in the industry for the purposes described herein. The foam core has an irregular shape and comprises a vertical portion 40 having a vertical face 42, best seen in FIG. 4, and upper and lower portions 44 and 46, respectively, extending therefrom. As shown in FIG. 2, the upper portion 44 and the lower portion 46 are in spaced-apart juxtaposition to define a cavity 48 therebetween.

The inner shell 24 comprises an irregularly-shaped frame having an upper flange 50 and a lower flange 52 in spaced-apart juxtaposition to define a cavity 54 therebetween. The upper flange 50 is in operable communication with part of the upper portion 44 of the foam core 22, and the lower flange 52 is in operable communication with part of the lower portion 46 of the foam core 22. Both the upper flange 50 and the lower flange 52 provide partial support to the foam core 22, so that the foam core 22 maintains its shape and positioning relative to the armrest 10.

Extending into the cavity 54 from the upper flange 50 and the lower flange 52 are a plurality of shear pins 56. The shear pins 56 comprise cylindrical-shaped pins having a diameter determined in accordance with a preselected shearing force necessary for the purposes described herein. The shear pins 56 are integrally formed with the upper flange 50 and the lower flange 52.

Figure 5:
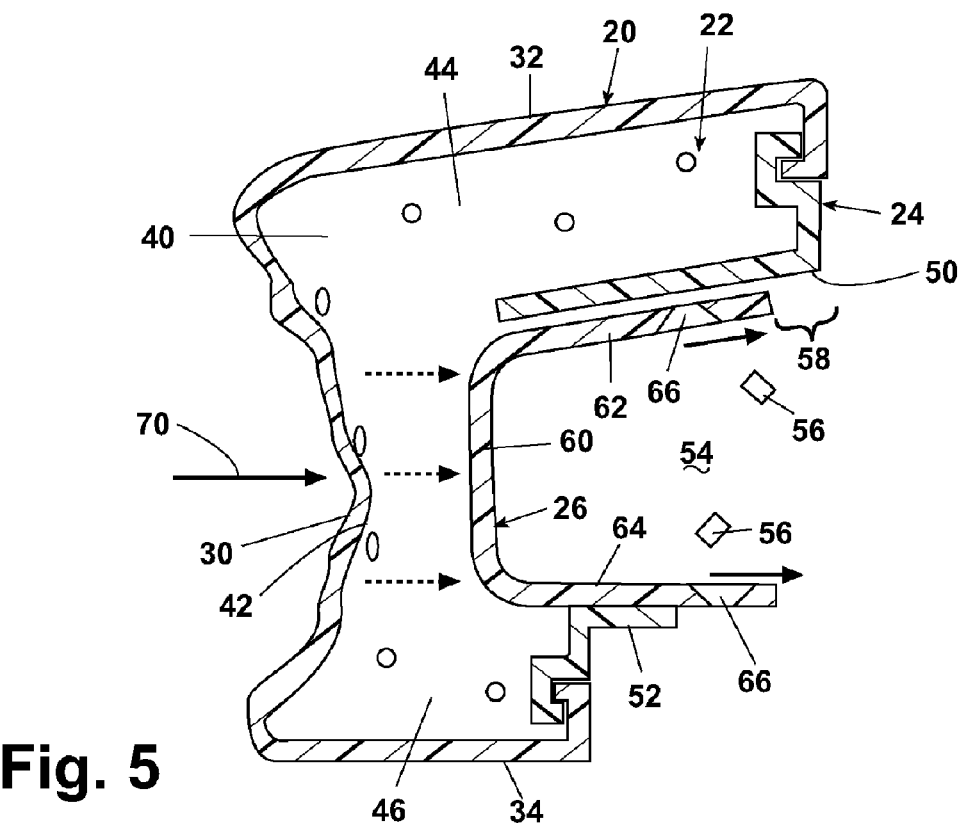
FIG. 5 is a sectional view of the armrest of FIG. 3 taken along line 4—4 showing the displacement of the collapsible frame upon the application of an external force to the armrest.

The collapsible frame 26 is a generally elongated member having a generally C-shaped cross-section comprising a vertical wall 60, and an upper wall 62 and a lower wall 64 in spaced-apart juxtaposition. The collapsible frame 26 is received within the cavity 54 as shown in FIG. 3 so that a portion of the upper wall 62 is in slidable communication with the upper flange 50, and a portion of the lower wall 64 is in slidable communication with the lower flange 52. The vertical wall 60 and the portions of the upper wall 62 and the lower wall 64 which are not in contact with the flanges 50, 52 are in operable communication with the foam core 22 to provide partial support to the foam core 22, so that the foam core 22 maintains its shape and positioning relative to the armrest 10. The upper wall 62 and the lower wall 64 are provided with a plurality of shear pin apertures 66 of suitable size and location for slidable communication with the shear pins 56. As shown in FIGS. 4 and 5, in one embodiment the shear pin apertures 66 have a frustoconical shape for enhancing the shearing action of the shear pins 56 as the collapsible frame 26 is displaced laterally and for enabling slight rotational displacement of the collapsible frame 26 relative to the inner shell 24 as an occupant rests against the armrest 10 while seated in the vehicle 12. The enhanced shearing can be performed by a narrower surface of the apertures 66 which can act as a knife blade against the shear pins 56. Alternatively, the apertures 66 can have a cylindrical shape of any other suitable shape.

The collapsible frame 26 is attached to the inner shell 24 so that the collapsible frame 26 extends laterally of the upper flange 50 and the lower flange 52 and the vertical wall 60 is in contact with the foam core 22. As so assembled, the foam core 22 encases the inner shell 24 and the portion of the collapsible frame 26 extending laterally of the flanges 50, 52 into the cavity 48. The collapsible frame 26 and the inner shell 24 form an internal frame providing structural rigidity to the armrest and a framework for the support of the foam core 22. As shown in FIGS. 4 and 5, the upper wall 62 does not extend laterally along the full length of the inner shell upper flange 50. Thus, a translation zone 58 is formed adjacent the upper wall 62 along the upper flange 50. As the collapsible frame 26 is moved laterally, the upper wall 62 moves laterally along the upper flange 50 into the translation zone 58 (FIG. 5). The collapsible frame 26 is able to move freely within the cavity 54 upon shearing of the shear pins 56 to enable the outer shell 20 and foam core 22 to deform during application of a force, as described hereinafter.

If an occupant strikes the armrest 10 with a force having a relatively low magnitude, the force will be transferred through the outer shell 20 and the foam core 22, to the collapsible frame 26. If the force has a magnitude less than a preselected value, the force will be resisted by the shear pins 56, and will be transmitted through the shear pins 56 to the inner shell 24 and to the door 14. However, as shown in FIG. 5, if the force, represented by the force vector 70, has a magnitude greater than a preselected value, such as might occur during an accident, the force 70 sufficiently urges the collapsible frame 26 laterally against the shear pins 56 to cause the shear pins 56 to shear off along the upper flange 50 and the lower flange 52. The collapsible frame 26 will continue to move laterally under the influence of the force 70 until the force 70 is removed. The displacement of the collapsible frame 26 will result in a void into which the vertical face 30 of the outer shell 20, and the vertical face 42 and parts of the upper portion 44 and lower portion 46 of the foam core 22 can be displaced, thereby cushioning the impact of the occupant against the armrest 10. The armrest 10 has an inner shell 24 which provides sufficient structural strength to support the armrest 10 mounted to the passenger door 14 and the foam core 22. However, upon impact, the displacement of the collapsible frame 26 will provide cushioning to an occupant, thereby reducing potential injury to the occupant otherwise caused by contact with a conventional armrest.

The novel armrest 10 provides a "crush zone" which allows a portion of the armrest 10 to crumple laterally when an occupant is thrown against the armrest 10 in a crash and/or the armrest 10 is urged into an occupant during a collision. This can occur because of the interior cavity 54 adjacent to the collapsible frame 26; as the foam core 22 crumples inwardly, the collapsible frame 26 can travel into the cavity 54 after shearing off of the shear pins 56. Since the armrest 10 is formed in an inverted C-shape (i.e., with leg portions extending above and below the collapsible frame 26) and the cavity 54 is defined by the C-shaped profile of the armrest 10, the collapsible frame 26 has the appropriate clearance necessary to travel as the foam core 22 crumples during an impact.

Another embodiment of an armrest 10# according to the invention is illustrated in FIGS. 6–11, where like objects are identified with like reference numerals bearing a prime (#) symbol. Similar to the first embodiment, the armrest 10# comprises an outer shell 20#, a foam core 22#, an inner shell 24#, which are components of a conventional armrest, and a collapsible frame 26#. The primary difference between the first and second embodiments is the structure, which will be detailed hereinafter, that couples the collapsible frame 26# with the inner shell 24#.

The outer shell 20# and the foam core 22# are substantially identical to the previously described outer shell 20 and foam core 22. The outer shell 20# covers the foam core 22# and has a vertical face 30#, an upper face 32#, and a lower face 34#. Preferably, the outer shell 20# is composed of a material, such as fabric, leather, vinyl, or other suitable polymeric material, that easily conforms to the geometry of the foam core 22# and blends well with other parts of the automobile door 12. The foam core 22# is composed of the semi-rigid foam mentioned in the first embodiment and comprises a vertical portion 40# having a vertical face 42#, and upper and lower portions 44# and 46#, respectively, extending therefrom.

Figure 8:
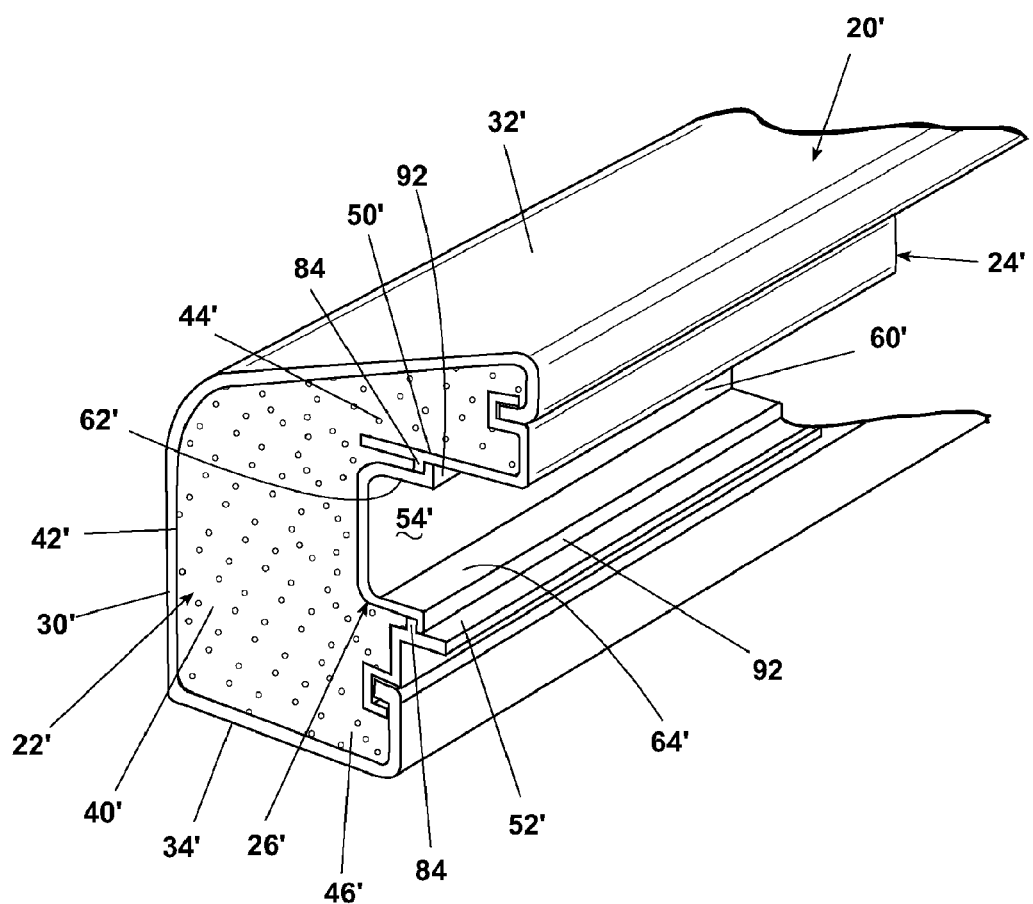
FIG. 8 is a partial perspective view of the interior of the armrest of FIG. 6 taken along line 8—8.
Figure 9:
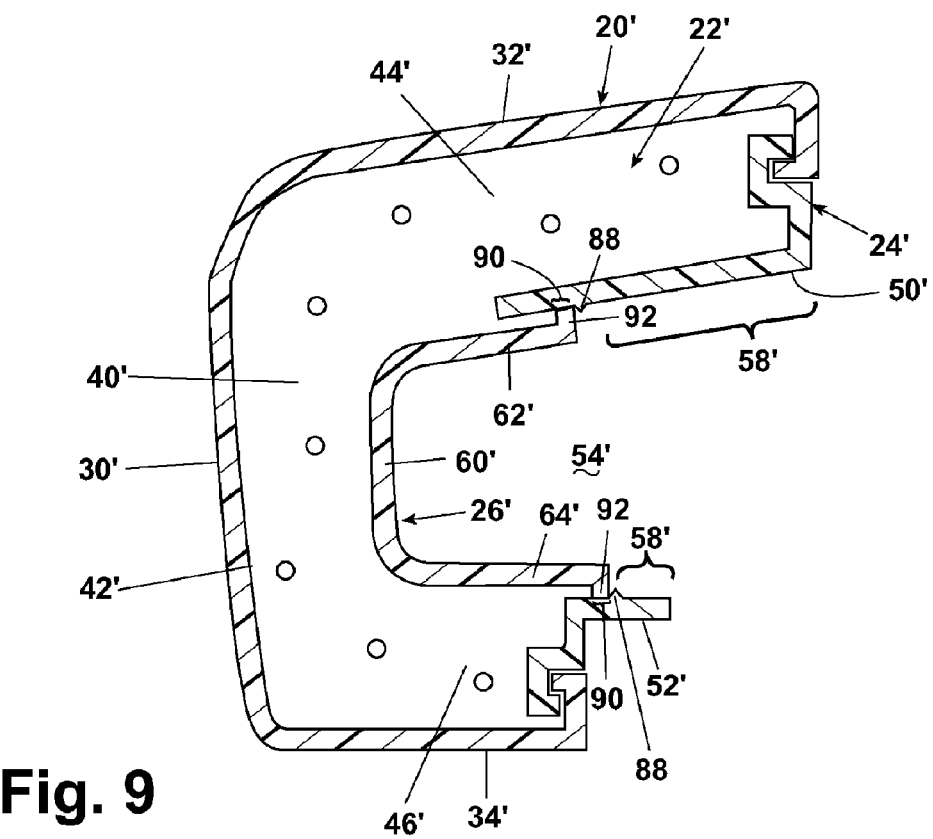
FIG. 9 is a sectional view of the armrest of FIG. 6 taken along line 9—9.

The inner shell 24# comprises an irregularly-shaped frame having an upper wall 50# and a lower wall 52# in spaced-apart juxtaposition to define a cavity 54# therebetween. As seen in FIGS. 8 and 9, the upper wall 50# is in operable communication with a portion of the upper face 32# of the foam core 22#, and the lower wall 52# is likewise in operable communication with part of the lower face 34#. Consequently, the inner shell 24# provides interior support for the foam core 22#.

Figure 6:
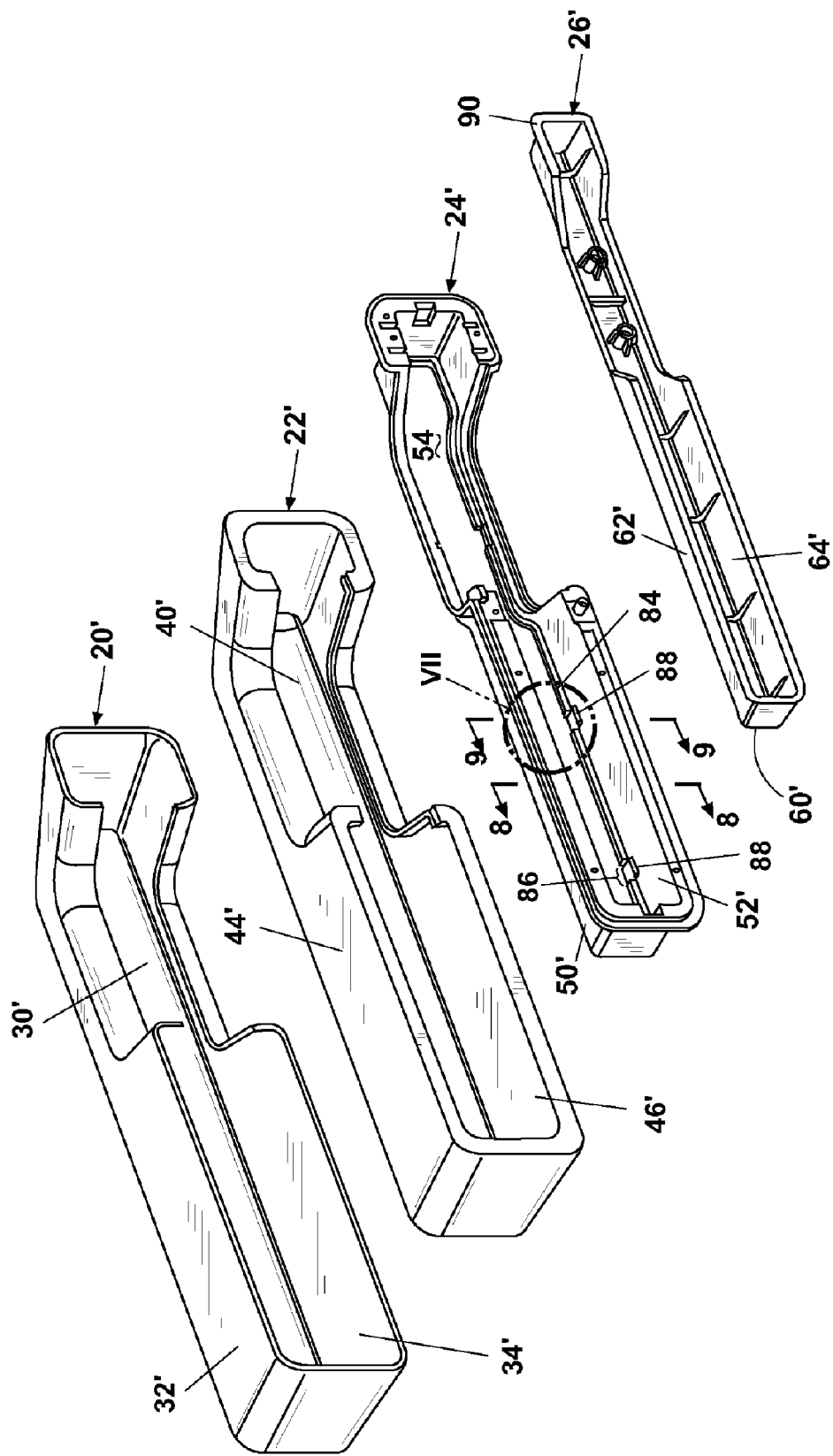
FIG. 6 is an exploded view of an alternative embodiment of an armrest according to the invention having an exterior identical to that of FIG. 1 and showing an outer shell, a foam core, an inner shell, and a collapsible frame comprising the armrest.
Figure 7:
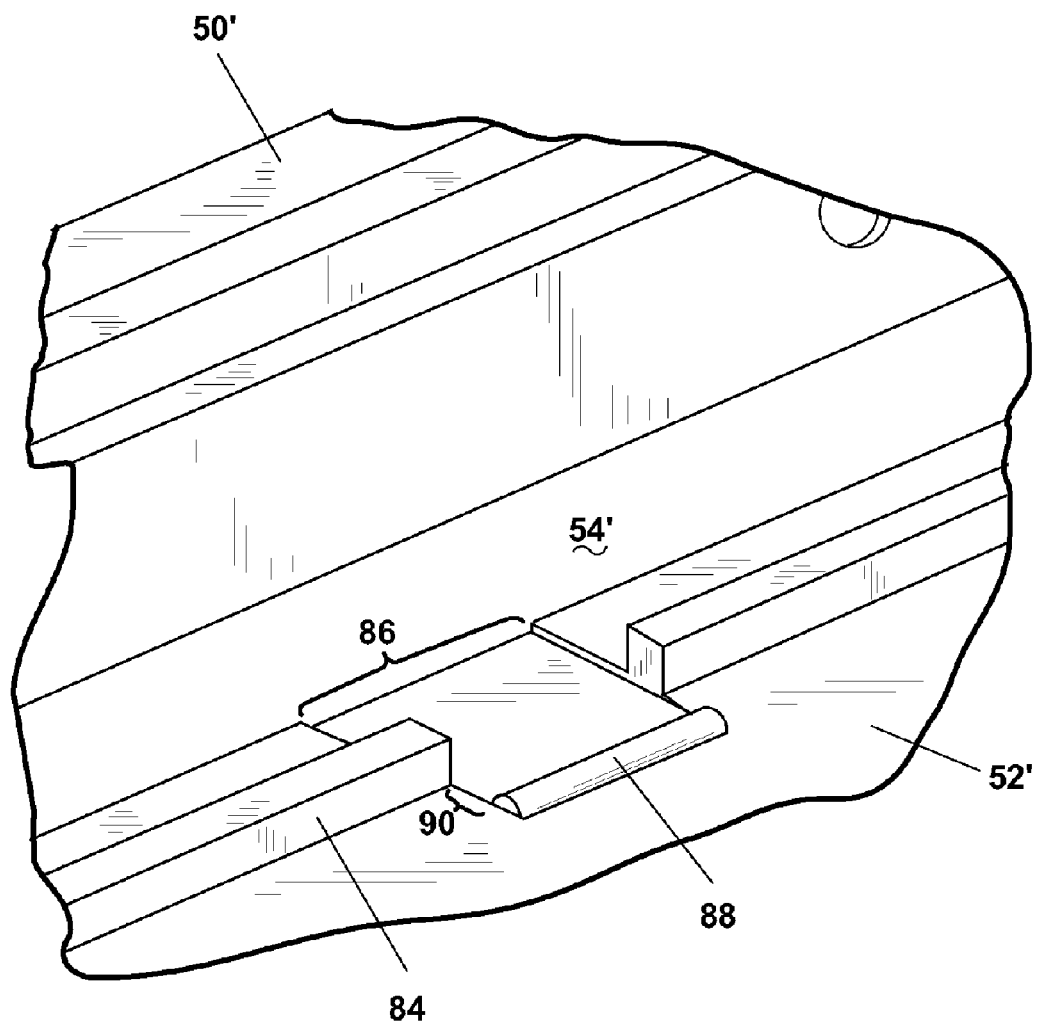
FIG. 7 is a perspective view of a portion VII of the inner shell of the armrest of FIG. 6.

Referring now to FIGS. 6 and 7 in particular, a lip 84 is disposed along the inner periphery of inner shell 24# and projects into the cavity 54#. The lip 84 is continuous around the entire periphery except for at least one, and preferably more than one, discontinuous region 86 on the upper and lower walls 50# and 52#. An integral retaining ridge 88 is disposed at each discontinuous region 86 and is offset from the lip 84 to define a space 90 therebetween. The ridges 88 have a length substantially equal to that of the discontinuous region 86 and have a height less than that of the lip 84. Furthermore, the ridges 88 are substantially semi-circular, triangular, or the like when viewed in cross-section, as shown in FIGS. 7 and 9. The profile and reduced height of the ridges 88 are designed to retain the collapsible frame 26# in place during normal use but permit lateral translation of the collapsible frame 26# during application of a predetermined force, as described hereinafter. Ultimately, the geometry of the ridges 88, in addition to material properties, determines the force required for lateral translation of the collapsible frame 26#.

The collapsible frame 26# is a generally elongated member having a generally C-shaped cross-section comprising a vertical wall 60# and upper and lower walls 62# and 64# in spaced-apart juxtaposition. The collapsible frame 26# further comprises a peripheral flange 92 on the edges of the upper and lower walls 62# and 64# opposite the vertical wall 60#. The height of the flange 92 is approximately equal to that of the lip 84. Furthermore, the flange 92 is sized to fit in the space 90 between the lip 84 and the retaining ridge 88.

As illustrated in FIGS. 8 and 9, the collapsible frame 26# is received within the cavity 54# so that a portion of the upper wall 62# is in slidable communication with the upper wall 50# of the inner shell 24#. Similarly, a portion of the lower wall 64# is in slidable communication with the lower wall 52# of the inner shell 24#. The vertical wall 60# and the portions of the upper and lower walls 62# and 64# that are not in slidable communication with the inner shell 24# are in operable communication with the foam core 22#.

To assemble the inner shell 24# and the collapsible frame 26#, the flange 92 is positioned in the space 90 between the lip 84 and the retaining ridge 88 such that the collapsible frame 26# extends laterally relative to the inner shell 24#. The foam core 22# with the outer shell 20# disposed thereon encases the inner shell 24# and the portion of the collapsible frame 26# that extends laterally from the inner shell 24#. When completely assembled, the armrest 10#, as seen in FIGS. 8 and 9, has a substantially C-shaped cross section, wherein the outer shell 20#, inner shell 24#, and the collapsible frame 26# effectively form a peripheral frame in which the foam core 22# resides. Further, the collapsible frame 26# and the inner shell 24# form an internal frame that provides structural rigidity to the armrest 10# and support for the foam core 22#.

In the assembled armrest 10#, the flange 92 snugly fits in the space 90; therefore, the collapsible frame 26# is maintained in position by the lip 84 and the retaining ridge 88. In this retained position, the upper and lower walls 62# and 64# do not extend laterally along the entire length of the upper and lower walls 50# and 52# of the inner shell 24#. As a result, a transition zone 58# is formed along each of the upper and lower walls 50# and 52# of the inner shell 24# along which the collapsible frame 26# is able to move freely. If subjected to an external force greater than a predetermined value, the collapsible frame 26# is pushed laterally, thereby gliding over the retaining ridges 88 and sliding into and laterally through the transition zone 58#.

The operation of this second embodiment of the invention is substantially similar to that of the first embodiment. The primary difference lies in the interaction between the collapsible frame 26# and the inner shell 24#. During normal operation, the armrest 10# located on the inside of an automobile door 14 provides a sturdy support on which an occupant can set his or her arm. If the occupant strikes the armrest 10# with a relatively low magnitude force, the force is transferred through the outer shell 20# and the foam core 22# to the collapsible frame 26#. If the force has a magnitude less than a predetermined value, then the force will be transmitted through the lip 84 and the ridges 88 to the inner shell 24# and the door 14.

Figure 10:
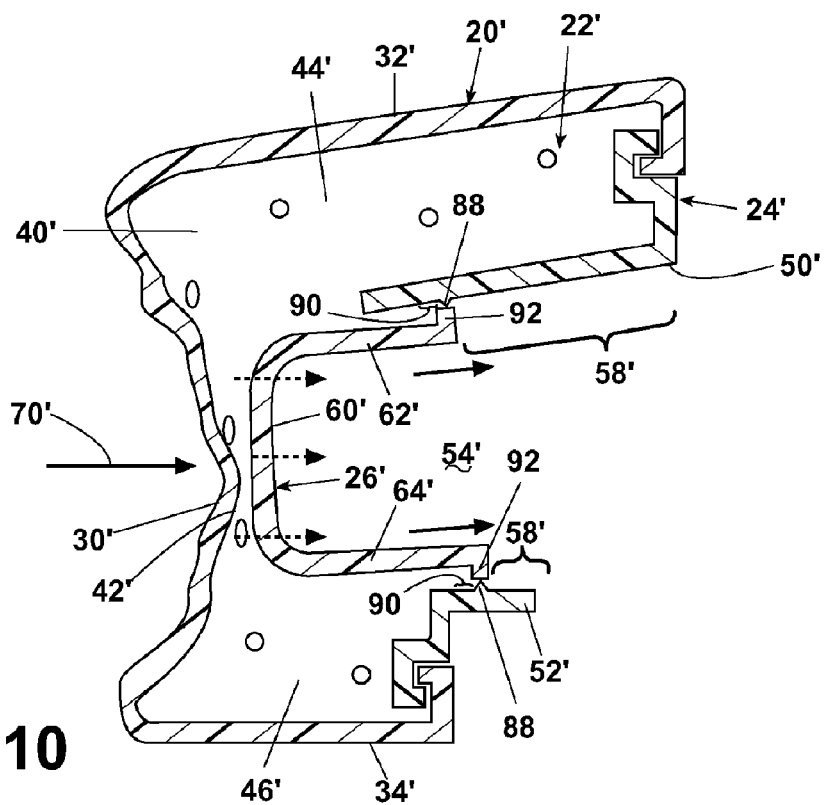
FIG. 10 is a sectional view of the armrest of FIG. 6 taken along line 9—9 showing displacement of the collapsible frame upon the application of an external force to the armrest, wherein the collapsible frame is in the process of sliding over a retaining ridge on the inner shell.
Figure 11:
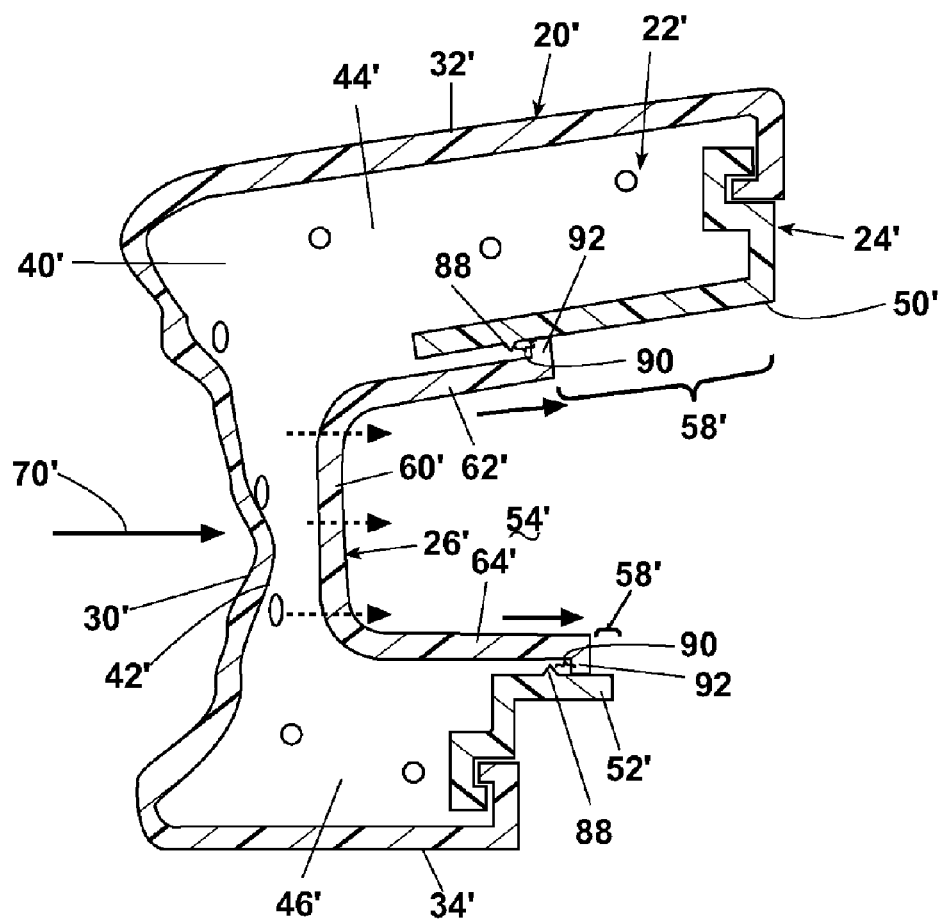
FIG. 11 is a sectional view of the armrest of FIG. 6 taken along line 9—9 showing displacement of the collapsible frame upon the application of an external force to the armrest, wherein the collapsible frame has completely slid over the retaining ridge on the inner shell.

If, on the other hand, the force, represented by a force vector 70# in FIGS. 10 and 11, is greater than the predetermined value, the force 70# will push the collapsible frame 26# laterally against the retaining ridges 88. Because the frame 26# is urged by the force 70#, the flange 92 slides up one angled or curved face of the ridge 88, reaches the peak of the ridge 88, as shown in FIG. 10, and slides down the other angled or curved face of the ridge 88. During this process, either one or both of the collapsible frame 26# and the inner shell 24# are slightly deflected. The ridges 88 effectively act as speed bumps over which the flange 90 can slide if the force 70# is greater than the predetermined value. Once the flange 92 is disposed on the opposite side of the ridges 88, as in FIG. 11, the collapsible frame 26# moves into the transition zone 58#. As described in the first embodiment, the collapsible frame 26# will continue to slide laterally along the transition zone 58# and into the cavity 54# under the influence of the force 70# until the force 70# is removed. The displacement of the collapsible frame 26# will result in a void into which the vertical face 30# of the outer shell 20# and the vertical face 42# and parts of the upper portion 44# and lower portion 46# of the foam core 22# are displaced, thereby cushioning the impact of the occupant against the armrest 10#. As a result, the novel armrest 10# provides a "crush zone" which allows a portion of the armrest 10# to crumple laterally when an occupant is thrown against the armrest 10# in a crash and/or the armrest 10# is urged into an occupant during a collision. Thus, while the armrest 10# has the inner shell 24# and collapsible frame 26# to provide structural strength for the armrest 10#, displacement of the collapsible frame 26#, upon impact, provides cushioning to the occupant, thereby reducing potential injury to the occupant otherwise caused by impact with a conventional armrest.

EXAMPLES

Figure 12:
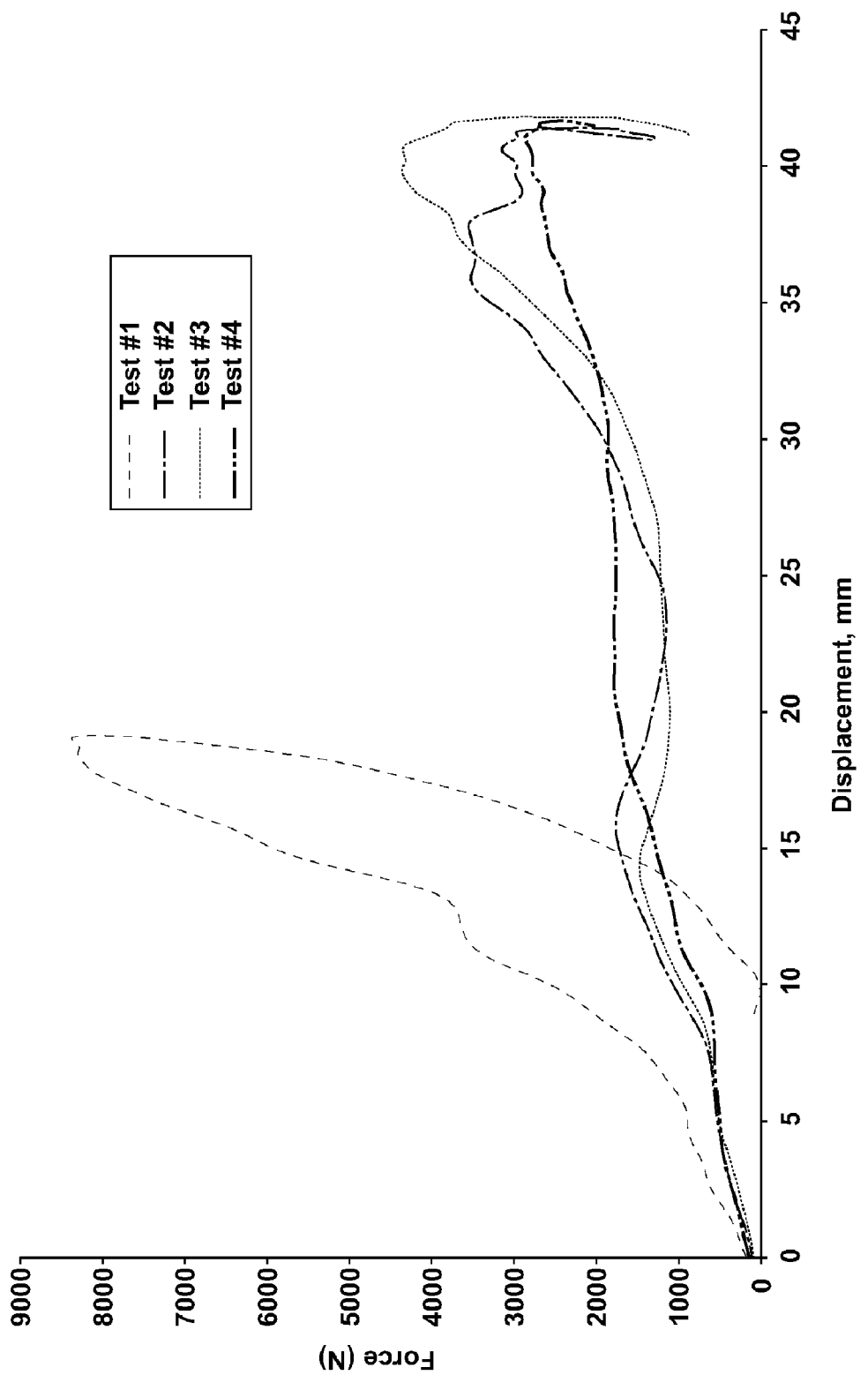
FIG. 12 is graph showing the results of laboratory testing of sample armrests having a structure consistent with that of the embodiment of FIG. 2.

Testing of actual armrest samples was conducted to determine the performance of the novel, modified armrest compared with that of a conventional, unmodified armrest. Sample armrests having shear pins were fabricated according to the invention and crushed by an impactor. Acceleration data was recorded for each test by two accelerometers positioned at the center of mass of the impactor. Data was collected at 10,000 Hz and filtered by a 600-class butterworth filter. Data from the second accelerometer was integrated once to determine velocity and integrated twice to determine displacement. Force was calculated by multiplying the acceleration data by the mass of the impactor (F=ma). The results from this testing are listed in Table 1 and illustrated graphically in FIG. 12.

TABLE 1

Testing of Unmodified Armrest Body Blocks

| Test Sample | Impact Velocity (m/s) | Force at 20 mm crush (N) | Force at 25 mm crush (N) |
|---|---|---|---|
| (1) Unmodified Body Block | 2.4 | 8391* | N/A |
| (2) Modified Body Block | 2.6 | 1319 | 1264 |
| (3) Modified Body Block | 2.6 | 1106 | 1222 |
| (4) Modified Body Block, Extra Foam | 2.5 | 1735 | 1760 |

*Displacement = 19.1 mm

It is apparent from the test results that, when compared to the unmodified armrest, the modified armrest requires less force to achieve an equivalent displacement. In the environment of the automobile, therefore, the modified armrest will more readily crush when struck by an occupant, thereby preventing or reducing the severity of injury to the occupant. The results also show the effect of increasing the amount of foam in the modified armrest.

Figure 13:
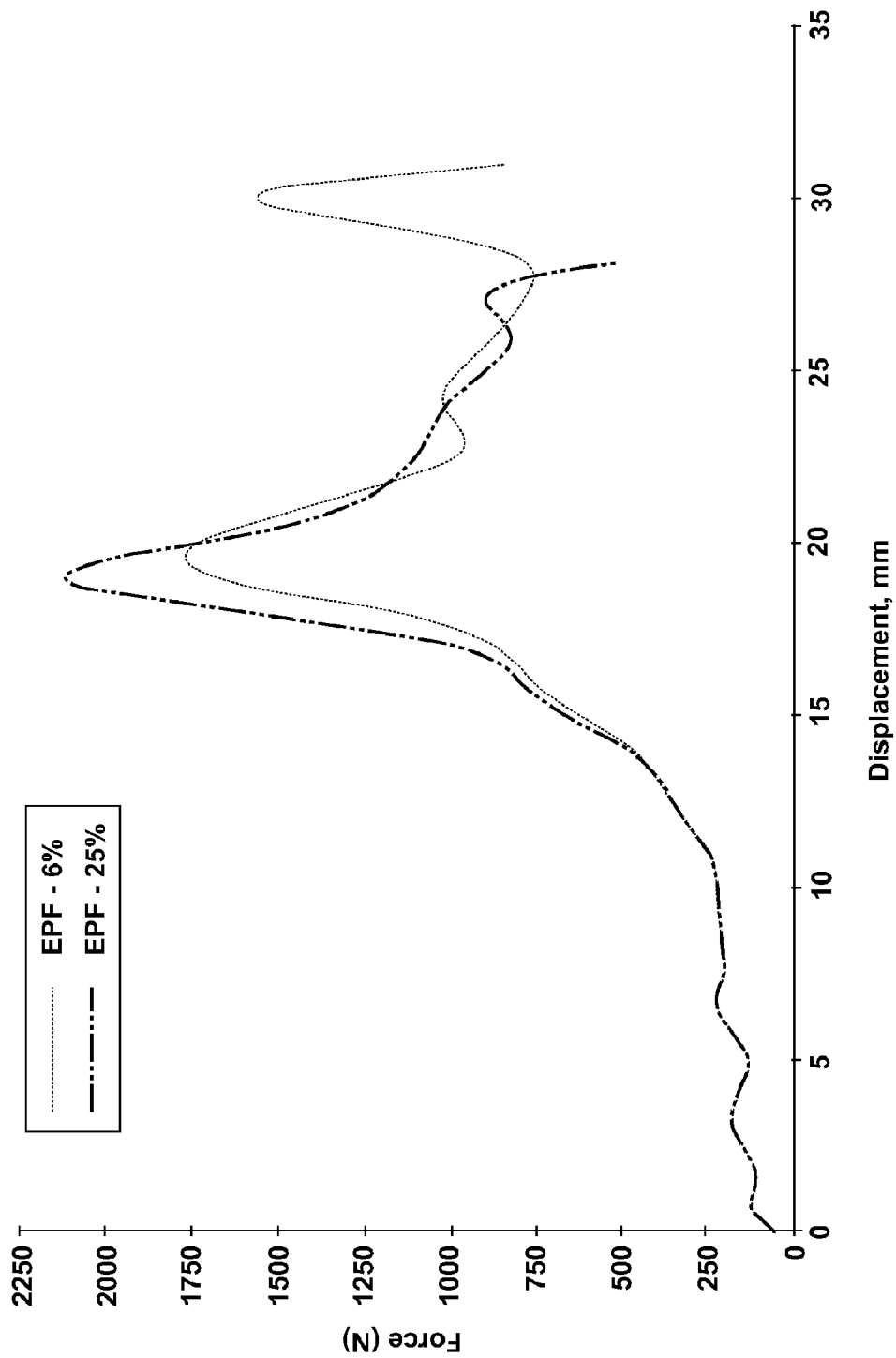
FIG. 13 is graph showing the results of finite element analysis testing of armrests having a structure consistent with that of the embodiment of FIG. 2.

In addition to the laboratory tests, finite element analysis of a model of an armrest with shear pins according to the invention was performed to determine force as a function of displacement. The analysis also investigated the influence of strain-rate dependent material properties. Strain is a measurement of deformation, and strain rate can be viewed as the rate of deformation. Plastics commonly have a lower effective plastic strain at failure (EPF) for higher strain rates. As seen in FIG. 13, the test with the higher (25%) EPF, or lower strain rate, failed at a force of 2113 N at 19 mm of displacement. Meanwhile, the test employing a lower (6%) EPF, or higher strain rate, failed at a lower force of 1765 N at a similar displacement of 19.65 mm. As stated above, a lower force corresponds to a lower crush resistance; therefore, the strain-rate dependency of a material should be considered in order to fine-tune the performance of the improved armrest.

The armrests 10 and 10# according to the invention offer several advantages. Ultimately, the invention presents an armrest or other vehicle passenger compartment component that has an exterior appearance identical to that of a conventional armrest or other component and has an internal structure that provides sufficient support during normal use yet collapses upon impact with an occupant to provide cushioning during a collision. Material selection, the type of interaction between the inner shell and the collapsible frame, the geometry of the shear pins or retaining ridges can be adjusted to control the mechanical properties of the armrest. The stiffness of the armrest can be engineered to be within appropriate biomechanical limits, and the reduced lateral strength can easily be altered to comply with safety guidelines. Furthermore, because the armrests have a simple design and are composed of the same materials as a conventional armrest, they are easy and relatively inexpensive to manufacture.

While the invention has been specifically described in connection with certain specific embodiments thereof, it is to be understood that this is by way of illustration and not of limitation, and the scope of the appended claims should be construed as broadly as the prior art will permit.

What is claimed is:

1. An armrest for a vehicle passenger compartment comprising:
   a collapsible frame deflectable in at least one direction upon a forcible impact received by the armrest, wherein the collapsible frame comprises:
      a first frame member adapted to be mounted to a support member in the vehicle passenger compartment to mount the armrest to the support member; and
      a second frame member mounted to the first frame member by a moveable mounting, wherein the moveable mounting comprises a mounting adapted to permit movement of the second frame member relative to the first frame member upon receipt of the forcible impact to the armrest, and at least one pin on one of the first frame member and the second frame member received by at least one aperture on the other of the first frame member and the second frame member corresponding to each of the at least one pin on the one of the first frame member and the second frame member, wherein the at least one pin is sheared off by the at least one corresponding aperture during relative movement of the second frame member with respect to the first frame member;
      a recess located within the armrest adjacent to the second frame member, wherein the recess provides an area for deflection of the second frame member upon receipt of the forcible impact; and
   a cover positioned over the collapsible frame.

2. The armrest of claim 1 wherein the forcible impact required to move the second frame member is less than that required if the second frame member were permanently mounted to the first frame member.

3. The armrest of claim 1 wherein the forcible impact required to move the second frame member is less than that able to cause injury to a bodily region of an occupant that collides with the armrest.

4. The armrest of claim 1 wherein the at least one aperture has a frustoconical shape to assist in shearing off the at least one pin.

5. The armrest of claim 1 and further comprising a core material located between the cover and the collapsible frame to provide a tactile feel for the armrest.

6. The armrest of claim 5 wherein the core is composed of a foam material.

7. The armrest of claim 6 wherein the foam material is semi-rigid.

8. The armrest of claim 7 wherein the cover is composed of a flexible material.

9. The armrest of claim 8 wherein the cover is composed of one of a leather, a fabric, and a polymeric material.

10. The armrest of claim 9 wherein the cover provides an architectural finish and is composed of a material that matches the vehicle passenger compartment.

11. The armrest of claim 10 wherein a forcible impact received against the cover deflects at least a portion of the core against the collapsible frame to cause deflection of the collapsible frame.

12. The armrest of claim 11 wherein the forcible impact required to move the second frame member is less than that required if the second frame member were permanently mounted to the first frame member.

13. The armrest of claim 11 wherein the forcible impact required to move the second frame member is less than that able to cause injury to a bodily region of an occupant that collides with the armrest.

14. The armrest of claim 3 and further comprising a core material located between the cover and the collapsible frame to provide a tactile feel for the armrest.

15. The armrest of claim 14 wherein the core is composed of a foam material.

16. The armrest of claim 15 wherein the foam material is semi-rigid.

17. The armrest of claim 14 wherein a forcible impact received against the cover deflects at least a portion of the core against the collapsible frame to cause deflection of the collapsible frame.

18. The armrest of claim 1 wherein the cover is composed of a flexible material.

19. The armrest of claim 1 wherein the cover is composed of one of a leather, a fabric, and a polymeric material.

20. The armrest of claim 1 wherein the cover provides an architectural finish and is composed of a material that matches the vehicle passenger compartment.

21. An armrest for a vehicle passenger compartment comprising:
   a substrate adapted to be fixedly mounting to a support panel in the vehicle passenger compartment;
   a cover mounted over the substrate;
   a core disposed between at least a portion of the substrate and the cover to provide a tactile feel to the armrest;
   a deflectable member retained against the substrate, wherein the deflectable member can overcome its retention against the substrate upon receipt of a suitably large impact force and move with respect to the substrate; and
   a moveable mounting adapted to permit movement of the deflectable member relative to the substrate upon receipt of a suitably large impact force to the armrest, wherein the retention of the deflectable member is performed by the moveable mounting;
   wherein the moveable mounting comprises at least one pin on one of the substrate and the deflectable member received by at least one aperture on the other of the substrate and the deflectable member corresponding to each of the at least one pin on the one of the substrate and the deflectable member; and
   wherein the at least one pin is sheared off by the at least one corresponding aperture when the deflectable member overcomes its retention against the substrate upon receipt of the impact force.

22. The armrest of claim 21 and further comprising a recess adjacent to the substrate, wherein the deflectable member can move into an area of the recess upon receipt of the impact force.

23. The armrest of claim 22 wherein the impact force deflects at least a portion of the core against the deflectable member to cause movement of the deflectable member.

24. The armrest of claim 21 wherein the at least one aperture has a frustoconical shape to assist in shearing off the at least one pin.

25. The armrest of claim 21 wherein the movable mounting comprises at least one edge on one of the deflectable member and the substrate received behind at least one ridge on the other of the deflectable member and the substrate corresponding to each of the at least one edge on the one of the deflectable member and the substrate.

26. The armrest of claim 25 wherein the at least one edge cams over the at least one ridge when the deflectable member overcomes its retention against the substrate upon receipt of the impact force.

27. The armrest of claim 26 wherein the at least one edge has one of a semi-circular and triangular profile.

28. The armrest of claim 27 wherein the cover is composed of a flexible material.

29. The armrest of claim 28 wherein the cover is composed of one of a leather, a fabric, and a polymeric material.

30. The armrest of claim 29 wherein the cover provides an architectural finish and is composed of a material that matches the vehicle passenger compartment.

31. The armrest of claim 30 wherein the core is composed of a foam material.

32. The armrest of claim 31 wherein the foam material is semi-rigid.

33. The armrest of claim 32 wherein the impact force required to move the deflectable member is less than that required if the deflectable member were permanently mounted to the substrate.

34. The armrest of claim 32 wherein the impact force required to move the deflectable member is less than that able to cause injury to a bodily region of an occupant that collides with the armrest.

35. The armrest of claim 21 wherein the impact force deflects at least a portion of the core against the deflectable member to cause movement of the deflectable member.

36. The armrest of claim 21 wherein the impact force required to move the deflectable member is less than that able to cause injury to a bodily region of an occupant that collides with the armrest.

37. The armrest of claim 21 wherein the cover is composed of a flexible material.

38. The armrest of claim 21 wherein the cover is composed of one of a leather, a fabric, and a polymeric material.

39. The armrest of claim 21 wherein the cover provides an architectural finish and is composed of a material that matches the vehicle passenger compartment.

40. The armrest of claim 21 wherein the core is composed of a foam material.

41. The armrest of claim 40 wherein the foam material is semi-rigid.

42. An armrest for a vehicle passenger compartment comprising:
a substrate adapted to be fixedly mounted to a support panel in the vehicle passenger compartment, the substrate defining a recess adjacent to the support panel and at least one retainer in register with the recess, the at least one retainer spaced inwardly from the support panel to define a translation zone between the support panel and the at least one retainer;
a deflectable member located in the recess for movement relative to the substrate, wherein the deflectable member has at least one engagement portion engaged with each of the at least one retainer on the substrate, wherein the engagement of the at least one retainer with the at least one engagement portion retains the deflectable member from moving into the translation zone, and wherein, upon receipt of a sufficiently large impact to the arm rest, the engagement of the at least one engagement portion with the at least one retainer is overcome and the deflectable member travels into the translation zone relative to the substrate;
a cover mounted over the substrate; and
a core disposed between at least a portion of the substrate and the cover to provide a tactile feel to the armrest.

43. The armrest of claim 42 wherein the retainer comprises at least one shear pin on one of the substrate and the deflectable member received by at least one aperture on the other of the substrate and the deflectable member corresponding to each of the at least one shear pin on the one of the substrate and the deflectable member.

44. The armrest of claim 43 wherein the at least one shear pin is sheared off by the at least one corresponding aperture when the deflectable member overcomes its retention against the substrate upon receipt of the impact.

45. The armrest of claim 44 wherein the at least one aperture has a frustoconical shape to assist in shearing off the at least one shear pin.

46. The armrest of claim 42 wherein the movable mounting comprises at least one edge on one of the deflectable member and the substrate received behind at least one ridge on the other of the deflectable member and the substrate corresponding to each of the at least one edge on the one of the deflectable member and the substrate.

47. The armrest of claim 46 wherein the at least one edge cams over the at least one ridge when the deflectable member overcomes its retention against the substrate upon receipt of the impact.

48. The armrest of claim 47 wherein the at least one edge has one of a semi-circular and triangular profile.

49. The armrest of claim 42 wherein the cover is composed of a flexible material.

50. The armrest of claim 49 wherein the cover is composed of one of a leather, a fabric, and a polymeric material.

51. The armrest of claim 50 wherein the cover provides an architectural finish and is composed of a material that matches the vehicle passenger compartment.

52. The armrest of claim 42 wherein the core is composed of a foam material.

53. The armrest of claim 52 wherein the foam material is semi-rigid.

54. The armrest of claim 42 wherein the impact required to move the deflectable member is less than that required if the deflectable member were permanently mounted to the substrate.

55. The armrest of claim 42 wherein the impact required to displace the deflectable member is less than that able to cause injury to a bodily region of an occupant that collides with the armrest.

56. The armrest of claim 42 wherein the impact deflects at least a portion of the core against the deflectable member to cause displacement of the deflectable member.

* * * * *

UNITED STATES PATENT AND TRADEMARK OFFICE
CERTIFICATE OF CORRECTION

PATENT NO. : 6,983,967 B2
DATED : January 10, 2006
INVENTOR(S) : David A. Scheidmantel et al.

It is certified that error appears in the above-identified patent and that said Letters Patent is hereby corrected as shown below:

<u>Title page,</u>
Item [12], should read -- Scheidmantel et al. --.
Item [75], Inventors, first inventors name should read -- David A. Scheidmantel --.

<u>Column 6, line 4 through Column 9, line 1,</u>
All occurrences of a pound sign "#", should be replaced with a prime symbol -- ' --.

Signed and Sealed this

Sixth Day of June, 2006

JON W. DUDAS
*Director of the United States Patent and Trademark Office*